L. PETERSON.
WAGON BRAKE SUPPORT.
APPLICATION FILED AUG. 5, 1915.

1,181,246.

Patented May 2, 1916.
2 SHEETS—SHEET 1.

INVENTOR:
Lars Peterson.
BY HIS ATTORNEY:
A. M. Carlsen.

L. PETERSON.
WAGON BRAKE SUPPORT.
APPLICATION FILED AUG. 5, 1915.
1,181,246.
Patented May 2, 1916.
2 SHEETS—SHEET 2.
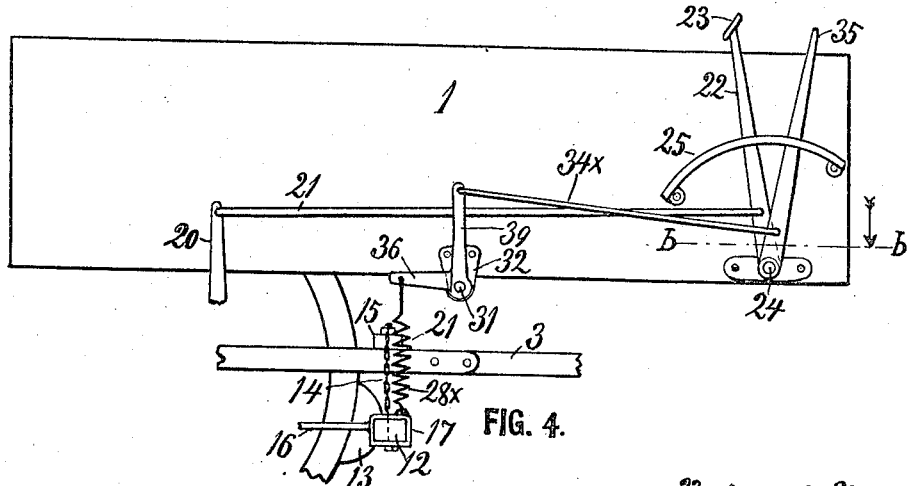
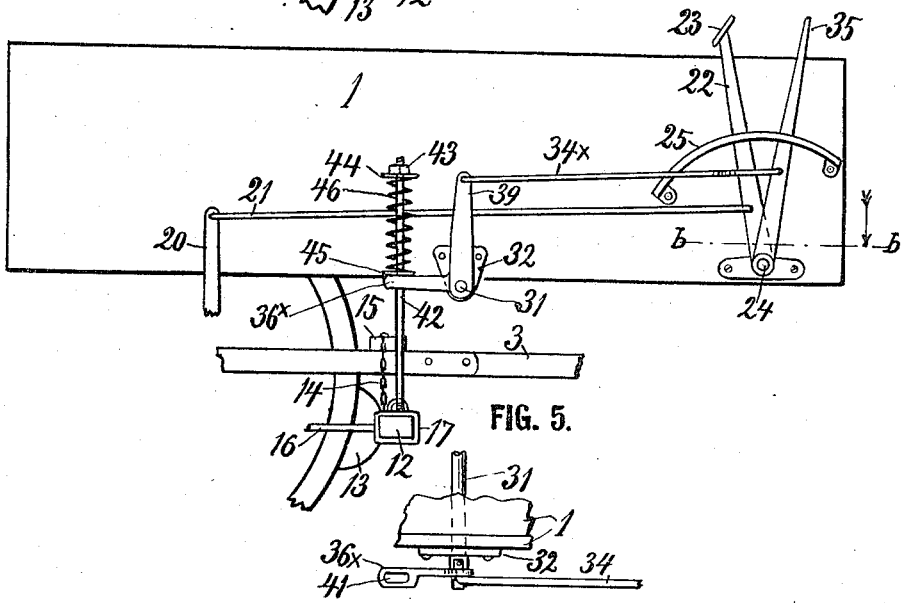
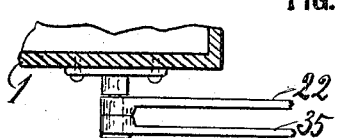
INVENTOR:
Lars Peterson.
BY his ATTORNEY.
A.M. Carlsen.

UNITED STATES PATENT OFFICE.

LARS PETERSON, OF COLMAN, SOUTH DAKOTA.

WAGON-BRAKE SUPPORT.

1,181,246.  Specification of Letters Patent.  Patented May 2, 1916.

Application filed August 5, 1915. Serial No. 43,896.

*To all whom it may concern:*

Be it known that I, LARS PETERSON, a citizen of the United States, residing at Colman, in the county of Moody and State of South Dakota, have invented a new and useful Wagon-Brake Support, of which the following is a specification.

This invention relates to wagon brake supports, and the main object is to provide such supporting means for the brakes of wagons and similar vehicles that the brake when applied to the wheels will not break or damage the reach of the wagon.

A second object is to make such brake supporting means easily adjustable according to the weight of the load when the latter causes the regular wagon springs to yield more or less.

A third object is to make such brake support resilient so it will respond to the vertical vibration of the wagon box when the wagon springs yield.

Figure 1:
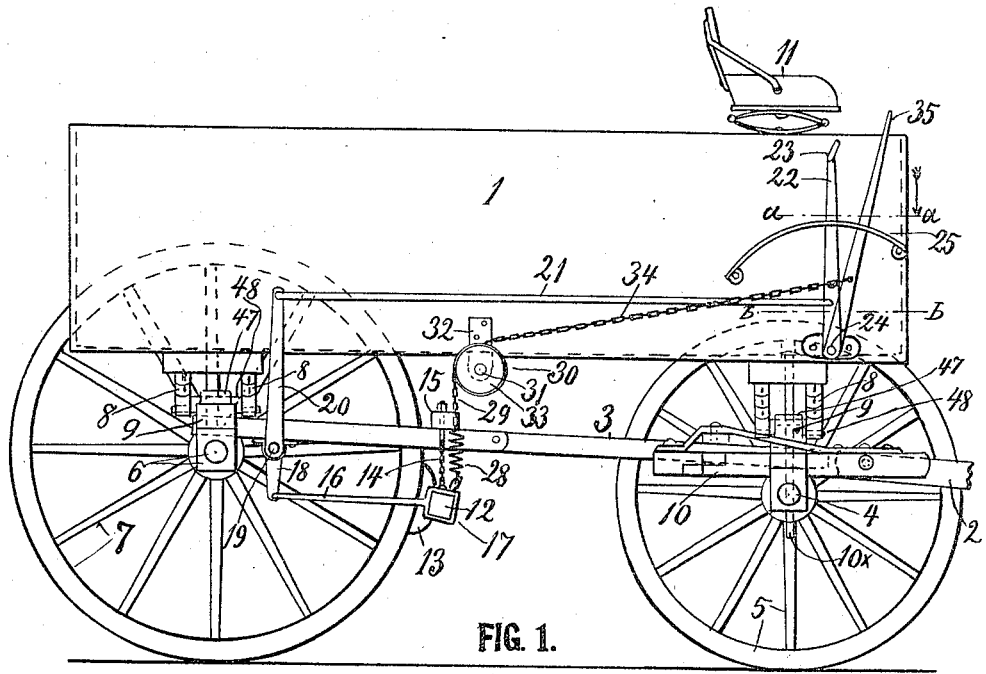
Figures 2, 3:
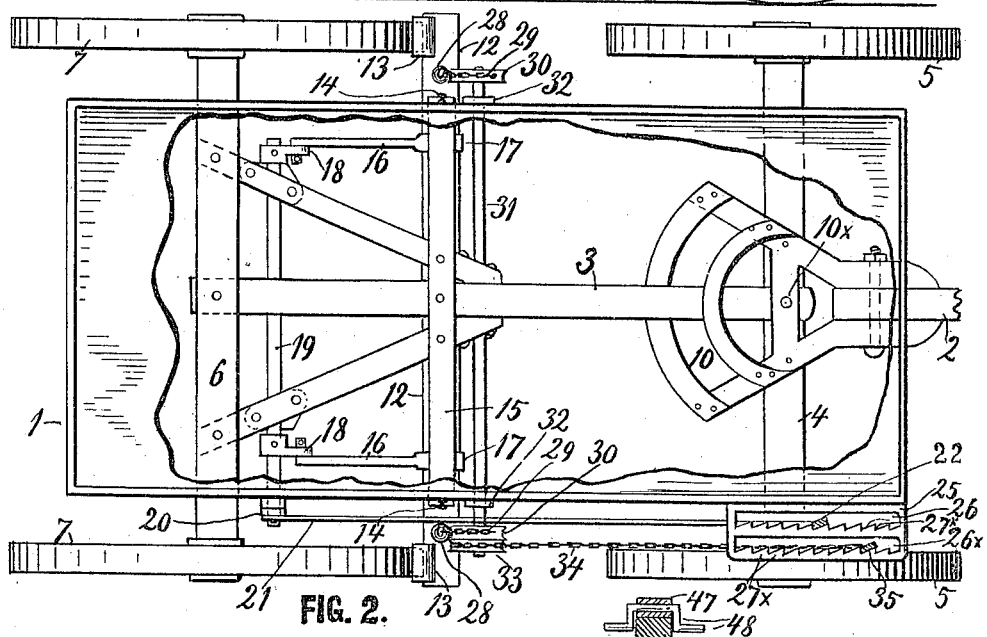

In the accompanying drawing,—Figure 1 is a side elevation of a wagon equipped with my new invention. Fig. 2 is a top view of Fig. 1 with many parts omitted and most of the bottom of the wagon box broken away so as to expose parts below it. In said view the levers 22, 35 are in section at the line $a$—$a$ Fig. 1. Fig. 3 is a detail view of one of the crank-shaped shafts or hangers supporting the ends of the wagon springs with the bearing and bolster supporting same in section. Fig. 4 is a portion of Fig. 1 with certain modifications. Fig. 5 is Fig. 4 further modified. Fig. 6 is a top view of the arm $36^{\times}$ and adjoining parts in Fig. 5. Fig. 7 is a section on line $b$—$b$ of either Figs. 1, 4 or 5 with the levers 22 and 35 leaning forward.

Referring to the drawings by reference numerals, 1 designates the box, 2 the pole or tongue, 3 the reach, 4 the front axle, 5 the front wheels, 6 the rear axle, 7 the rear wheels, 8 the springs, 9 the bolsters, 10 the fifth-wheel, $10^{\times}$ the king bolt and 11 the seat of any ordinary wagon or similar vehicle having its box supported on springs of the type 8 or of any other suitable type. In such wagons the brake beam 12 is provided with brake-shoes 13 and suspended by chains 14 from a bar 15 secured across the reach 3. The brake is operated by one or more rods 16 having each one end attached to the brake beam 12 by a loop 17 or other means and the other end attached to a radial arm 18 of a rock shaft 19, which is journaled across the rear part of the reach and provided with a rocker arm 20 connected by a rod 21 to a lever 22 having a foot block 23 so that it may be operated by either hand or foot from the seat 11. Said lever 22 is fulcrumed on a stud 24 and swings in a slot 26 of a segment 25 having teeth 27 by which to hold the lever in any desired position, the lever being preferably resilient enough to spring in between the teeth when it is released from the operator's hand.

With the usual brake arrangement just described a heavy load, when driving down an incline and the brake is set, has a strong tendency to act frictionally through the rear wheel on the brake shoes and pull them downward with a force liable to break the reach by pulling on the chains or other hangers 14. Now to relieve the reach of the undue strain just mentioned, I support the brake beam by two coil-springs 28, which in Figs. 1 and 2 are attached to short chains 29 wound on pulleys 30 fixed on a shaft 31, which shaft extends across underneath the wagon box and is journaled thereto by two hangers 32. Fixed on said shaft is a third pulley 33, on which is fixed one end of a chain 34, of which the front end is secured to a hand-lever 35. The latter lever may also be fulcrumed on the stud 24 and swings in another slot $26^{\times}$ in the segment 25, where it may be engaged by the teeth $27^{\times}$ thereof. With this construction the brake beam 12 is normally but slightly supported by the springs 28, but while going down a hill the driver before applying the brake lever 22 swings the lever 35 forward and engages it with some tooth near the front end of the segment 25 and thereby increases the tension of the springs 28 more or less according to the weight of the load, supporting thereby the brake from the wagon box and its main springs 8. Said movement of the lever 35 also serves to compensate for the tension the springs 28 lose when a heavy load displaces the wagon box downward toward the reach and the brake-beam. It will also be understood that in operation the brake-supporting springs when reaching the predetermined maximum tension can not be further strained because the chains 14 will then prevent further tension and will aid the springs 28 to support the brake; this holds good also in the modifications shown in Figs. 4 and 5, which will now be described.

In the modification shown in Fig. 4 the springs 28ˣ have their upper ends attached to radial arms 36 of the rock-shaft 31, and said shaft is also provided with a third rocker-arm 39, which is connected by a rod 34ˣ with the lever 35.

In the modification shown in Fig. 5 the arms 36ˣ are each provided with an aperture 41 (see Fig. 6); up through said aperture extends at each side of the wagon box, from the brake beam 12, a rod 42 having near its top a nut 43 and a washer 44. Between said washer and a washer 45 resting upon the arm 36ˣ is partly compressed a coil-spring 46 guided on the rod 42.

It is obvious that in Fig. 4 the springs 28ˣ and in Fig. 5 the springs 46 may have their tension varied by the rod 34ˣ and lever 35, just the same as in Fig. 1 by the chains 29 and 34 and the pulleys 30, 33.

In Fig. 3 is best shown how upon the bolsters 9 are secured bearings 47 for short crank-shafts 48, whose ends are embraced by the ends of the springs 8, as shown in Fig. 1, said cranks serving as hangers whose lower ends may spread apart when the springs 8 are sprung downward at the middle and thereby become longer, or require more space.

What I claim is:

1. In a wagon or like vehicle having a reach and a spring-supported box above the reach, the combination with a brake suspended from the reach, and means for setting the brake, of springs supporting the brake from the wagon box, and means for readily varying the tension of said springs.

2. In a wagon or like vehicle having a reach and a spring-supported box above the reach, the combination with a brake suspended from the reach and means for setting said brake, of springs supporting the brake from the wagon box, and means for readily varying the tension of said springs and for taking up the slack in the springs caused by the downward displacement of the box when it is loaded.

In testimony whereof I affix my signature.

LARS PETERSON.